Patented Apr. 17, 1951

2,549,097

UNITED STATES PATENT OFFICE 2,549,097

PREPARATION OF MALONALDEHYDE DIANILS

Charles F. Jelinek, Easton, Pa., and Roger F. Kleinschmidt, Belvidere, N. J., assignors to General Aniline & Film Corporation, New York, N. Y., a corporation of Delaware No Drawing. Application December 1, 1948, Serial No. 62,968

3 Claims. (Cl. 260—566)

This invention relates to novel dianils of malonaldehyde and a method of preparing the same.

It has been found that novel dianils of malonaldehyde, which are useful as intermediates in the preparation of certain sensitized dyes, are readily obtained in good yield by reacting a malonaldehyde diacetal in an acid medium with an aromatic primary amine.

These dianils of malonaldehyde cannot readily be synthesized by the usual treatment with the known process of reacting aldehyde with an amine to yield an anil since malonaldehyde is extremely unstable and will condense with itself. We have found, however, that dianils of malonaldehyde may be obtained in good yield by reacting a malonaldehyde diacetal with a primary aromatic amine in the form of its salt with a strong mineral acid. While, as indicated by the detailed examples appearing below, the amine salt as such may be reacted with the malonaldehyde diacetal, it is preferable to carry out the reaction in the presence of a slight excess of acid, and in the preferred form of practicing the present invention the reaction is effected by mixing a malonaldehyde diacetal with a dilute acid, for instance such mineral acids as hydrochloric, sulfuric, phosphoric and the like, or organic acids which are strong enough to cause rapid hydrolysis of the acetal, such as acetic acid, and warming the mixture gently with stirring until one liquid phase is obtained. An aqueous solution of two molar equivalents of a primary aromatic amine in the form of its salt with a strong mineral acid (e. g. amine hydrochlorides), or preferably dissolved in slightly excess aqueous acid is then added slowly with stirring and with or without continued heating. A thick paste of orange-red product (malonaldehyde dianil) rapidly forms. The malonaldehyde dianil, in the form of its salt with the acid employed during the reaction, may then be recovered by filtration and is preferably washed with a mixture of alcohol and dilute aqueous acid in order to remove impurities and by-products of the reaction. This product, the dianil hydrochloride, may be readily converted to a free base by treating a solution thereof with an excess of a solution of an alkaline agent such as an alkali metal hydroxide or carbonate.

In order to fully illustrate the present invention to those skilled in the art, a detailed description of preferred embodiments thereof is given in the following specific examples, in which the parts are by weight:

Example I

A mixture of 51.5 parts of methyl triethyl malonaldehyde diacetal and 15 parts dilute hydrochloric acid were stirred and gently heated until a yellow, one-phase solution is obtained. A solution of 46.5 parts of aniline in excess dilute hydrochloric acid is added dropwise with stirring. The thick orange precipitate is filtered off, washed with a 2:1 solution of methyl alcohol and dilute hydrochloric acid and air dried. Yield=44 parts, or 68%. M. P. 198–201° C. This dianil hydrochloride was then recrystallized from dilute alcohol and recovered as a product having a melting point of 209–211° C. The yellow dianil (free base) was obtained by adding aqueous sodium hydroxide to an alcoholic solution of the dianil hydrochloride. The product recrystallized from dilute alcohol had a melting point of 112–114° C.

Example II

A mixture of 100 parts of methanol and 20 parts of water were heated to reflux and 20 parts (.8 mol) of sulfaguanidine hydrochloride were added thereto and dissolved with stirring. There was then added, dropwise with stirring, 10.3 parts (.5 mol) of triethyl methyl acetal of malonaldehyde. The pale yellow solution immediately turned to orange and precipitation occurred after about one-third of the acetal was added. The addition of 20 parts of water did not effect solution of the precipitate. After the acetal had all been added, the mixture was heated and stirred under reflux for 2 hours. Most of the solvent was then removed by distillation under reduced pressure and the yellow solid was collected on a filter.

The resulting product was obtained in a yield of 20 parts and had a melting point of 202.5–205° C. (dec.). After recrystallization from water, the product melted at 206–207° C. (dec.). The identity of the product was established by alkaline hydrolysis to give a sulfaguanidine and by the following analysis:

Calculated for $C_{17}H_{22}O_4N_8S_2Cl_2$: C, 37.99; H, 4.10; N, 20.86.
Found: C, 38.20; H, 4.25; N, 20.72

The condensation occurred with the aromatic amino group rather than the guanidine amino group, since no Schiff's bases were recovered in reactions under similar conditions between N-guanyl-p-nitrobenzenesulfonamide and the acetal.

Example III

The procedure of Example I was repeated using 2-bromo-malonaldehyde, methyl triethyl diacetal. The dianil dihydrochloride was recovered as an orange solid, melting at 202–204° C.

Analysis: Calculated for N-7.50  Found, N-7.64
$C_{15}H_{15}N_2Cl_2Br$
The free base melted at 144–149°
Analysis: Calculated for N-9.3  Found, 9.37
$C_{15}H_{13}N_2Br$ It will be apparent that the foregoing examples are illustrative only of preferred embodiments of the process of the present invention and that various modifications may be made therein without departing from the spirit of the invention or the scope of the appended claims. The reaction can be illustrated by the following general equation:

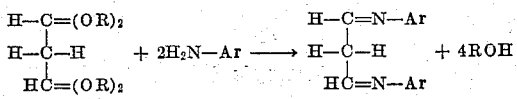

wherein R is hydrocarbon and Ar is aryl, and from a consideration thereof it will be apparent that in place of the methyl triethyl malonaldehyde diacetal employed in the foregoing example, a number of other acetals of malonaldehyde may be used, if desired, since alcohol is formed as a by-product of the reaction and the nature of the groups OR in the above equation is therefore without effect on the reaction. However, as a practical matter, the lower alkyl acetals of malonaldehyde are preferred and as examples of such acetals which my be used, if desired, may be mentioned malonaldehyde tetramethyl acetal and malonaldehyde tetraethyl acetal.

It will also be apparent that a wide variety of primary aromatic amines may be employed in practicing the present invention, the nature of the dianil which is formed being governed by the particular primary aromatic amine which is employed, as indicated by the foregoing equation. As examples of primary aromatic amines which may be used in place of aniline in the foregoing examples may be mentioned nuclear substituted anilines (e. g. toluidines, anisidines, etc.), naphthylamines, amino-anthracenes, amino-anthraquinones and other primary amino aromatic compounds, wherein the amino group is attached directly to an aromatic nucleus. It will also be understood that, if desired, in place of adding the amine as such, or in the form of its salt, with a strong mineral acid to the reaction mixture, compounds which can be converted to aromatic primary amines under acid conditions may be employed as the source of the aromatic primary amine in practicing the present invention. Thus compounds such as acylamino compounds (i. e. carboxylic acid amides), anils, etc., which may be converted to aromatic primary amines under acid conditions of the reaction may be employed as the source of aromatic primary amine.

While it has been found that the process of the present application is operable with or without heating, it is preferable to employ heating to a temperature of from 50–75° C. in order to obtain a good rate of reaction, while avoiding undesirable side reactions. However, it has been found that the process is operable within the range of from 0° C. to at least 100° C.

It will also be apparent that the process of the present invention may be used to produce dianils of substituted malonaldehydes and that the nature of the substituent on the beta carbon atom of the malonaldehyde diacetal is not highly critical so far as operability of the process is concerned, and therefore, for the purposes of the present invention substituted malonaldehydes of the following general formula:

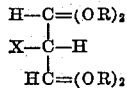

wherein X stands for hydrogen, halogen or hydrocarbon (i. e. alkyl [e. g. methyl, ethyl, butyl, lauryl, stearyl, etc.]); aralkyl (e. g. benzyl); or aryl (e. g. phenyl, tolyl, naphthyl, etc.) may be considered the equivalent of malonaldehyde diacetals mentioned above. Examples of such substituted malonaldehyde diacetals include halomalonaldehydes of the type describe in copending application Serial No. 9,021, filed February 17, 1948, by Roger F. Kleinschmidt. The reaction using such substituted malonaldehyde acetals is illustrated by the following general equation:

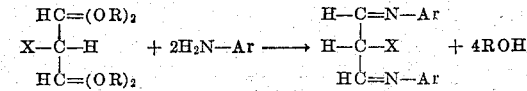

It will be apparent that the resulting dianil may exist in an isomeric form or as a mixture of the two isomers, as shown by the following equation:

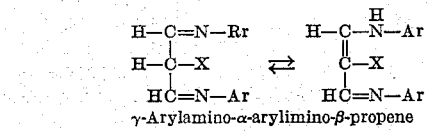

γ-Arylamino-α-arylimino-β-propene

We claim:

1. The process of producing a dianil of a malonaldehyde, which comprises reacting a malonaldehyde diacetal of the formula:

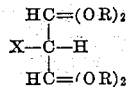

wherein X represents a member of the group consisting of hydrogen, halogen, alkyl, aralkyl and aryl radicals, and R represents a member of the group consisting of alkyl and aryl radicals, in an aqueous acid medium with a primary aryl amine.

2. The method of producing a dianil of malonaldehyde, which comprises reacting a lower alkyl diacetal of malonaldehyde in an aqueous acid medium with a primary aryl amine.

3. The method as defined in claim 2 wherein the primary aryl amine is aniline.

CHARLES F. JELINEK.
ROGER F. KLEINSCHMIDT.

REFERENCES CITED

The following references are of record in the file of this patent:

UNITED STATES PATENTS

| Number | Name | Date |
|---|---|---|
| 2,073,759 | Schneider | Mar. 16, 1937 |
| 2,111,183 | Heillron et al. | Mar. 15, 1938 |
| 2,435,002 | Hartmann et al. | Jan. 27, 1948 |
| 2,465,586 | Gasper | Mar. 29, 1949 |

OTHER REFERENCES

Claisen: "Ber. deut. chem.," vol. 36 (1903), pp. 3667–3668.

Harries: "Ber. deut. chem.," vol. 36 (1903), p. 3659.

Dieckmann et al.: "Ber. deut. chem.," vol. 37 (1904), pp. 4639–4641.

Reitzenstein et al.: "J. Prakt. Chem.," Series 2, vol. 86 (1912), pp. 9 and 51.